2,819,277
Patented Jan. 7, 1958

2,819,277
17-ALKYL-19-HYDROXYTESTOSTERONES

Frank B. Colton, Chicago, Ill., assignor to G. D. Searle & Co., Chicago, Ill., a corporation of Delaware No Drawing. Application August 27, 1956
Serial No. 606,200

5 Claims. (Cl. 260—397.4)

The present invention relates to a new type of luteoid agents and, more particularly to 17-alkyl-19-hydroxy-testosterones of the general structural formula

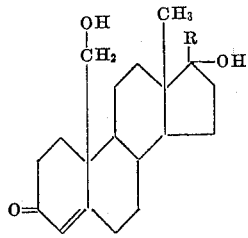

wherein R is a lower alkyl radical containing at least two carbon atoms.

United States Patent 2,721,871, issued October 25, 1955, describes 17-alkyl derivatives of 19-nortestosterone and their synthesis from nor-steroids. The high cost of the nor-steroidal starting materials makes it desirable to find alternate routes of synthesis using as starting material the normal steroids which contain a methyl group in the 19-position. It has now been found possible to achieve this result in a two-step reaction. 17-ethyltestosterone and its higher homologs can be oxidized in the 19-position by biochemical means, using microorganisms or adrenal tissue preparations. The products thus obtained, the 17-alkyl-19-hydroxytestosterones of the structural formula given herein above, can be converted to the 17-alkyl derivatives of 19-nortestosterone by treatment with a base such as sodium hydroxide, potassium carbonate, an alkali-metal alkoxide, an aluminum alkoxide and the like. This degradation proceeds smoothly without the necessity for external heating. The lower alkanols are suitable solvents.

Example 1

One part of 17-ethyltestosterone is stirred with 5000 parts of citrated beef blood and 5000 parts of 0.85% aqueous sodium chloride solution. This solution is perfused three times through a surviving beef adrenal, which is cannulated through the vein and has a finely lacerated surface. The perfusate is then extracted with isopropyl acetate. This extract is dried by azeotropic distillation and then concentrated to a residue of about 20 parts. After dilution with about 400 parts of benzene the solution is poured into a chromotography column containing silica gel. The column is developed with benzene solutions containing increasing concentrations of ethyl acetate. Elution with a 35% solution of ethyl acetate and benzene and concentration of the eluate yields 17α-ethyl-19-hydroxy-testosterone. The infrared absorption spectrum of this compound shows maxima at 2.8 to 2.95, 6.05 and 6.2 microns.

Treatment of 2 parts of 17α-ethyl-19-hydroxytestosterone in 5 parts of ethanol with 10 parts of a 3.2-N aqueous potassium hydroxide solution at room temperature for three hours is followed by neutralization with acetic acid. The alcohol is removed under vacuum and the residue is diluted with water and extracted with dichloromethane. The residue thus obtained is dissolved in benzene and applied to a silica gel chromotography column. The column is washed with benzene and then with benzene solutions containing increasing concentrations of ethyl acetate. Elution with a 25% solution of ethyl acetate in benzene, concentration of the resulting eluate under vacuum and recrystallization from methanol yields 17-ethyl-19-nortestosterone melting at about 140–141° C.

Example 2

Substitution of 17-propyltestosterone for the 17-ethyltestosterone used in the preceding example yields the corresponding 17α-propyl derivatives. The infrared absorption spectrum of 17-propyl-19-hydroxytestosterone shows maxima at 2.8, 2.95, 6.0, and 6.2 microns. 17α-propyl-19-nortestosterone thus obtained melts at about 122–123° C. on crystallization from z mixture of acetone and petroleum ether.

Example 3

In a high-speed blender 100 parts of frozen beef adrenal glands are homogenized with 300 parts of an ice-cold isotonic phosphate buffer solution of sodium dihydrogen phosphate and disodium hydrogen phosphate of neutral pH for 40 seconds and then centrifuged at 5000× g for 25 minutes. The residue thus obtained is washed twice with isotonic phosphate buffer solution and then suspended in 80 parts of a mixture (6:1:3 by volume) of aqueous 0.17 molar sodium malate, 0.12 molar magnesium chloride and 0.1 molar sodium phosphate solution. With this homogenate preparation, 1 part of 17-ethyltestosterone in 40 parts of propylene glycol is incubated with shaking at 37.5° C. for one hour, the gas phase being air.

The resulting incubate is poured into 800 parts of acetone and stirred for 3 hours at 5° C. The residue is collected on a suction filter, homogenized in acetone and stirred in 200 parts of acetone for two hours and allowed to stand for 12 hours at 0° C.

The combined acetone extracts of the incubate are brought to dryness under vacuum and the resulting residue is applied to a silica gel chromatography column in a benzene-hexane solution. The column is developed with mixtures of benzene and ethyl acetate containing increasing concentrations of ethyl acetate. The eluate containing 35% ethyl acetate and 65% benzene is concentrated and the residue is crystallized from methanol to yield 17α-ethyl-19-hydroxytestosterone, which is identical with the product obtained in Example 1.

What is claimed is:

1. A 17α-alkyl-19-hydroxytestosterone wherein the 17α-group is a lower alkyl radical containing at least two carbon atoms.
2. 17α-ethyl-19-hydroxytestosterone.
3. 17α-propyl-19-hydroxytestosterone.
4. The process for the preparation of a 17α-alkyl-19-nortestosterone, wherein the 17α-group is a lower alkyl radical containing at least two carbon atoms, which comprises contacting a 17α-alkyl-19-hydroxytestosterone with a base.
5. The process of preparing 17α-ethyl-19-nortestosterone which comprises contacting 17α-ethyl-19-hydroxytestosterone with a base.

No references cited.